(12) United States Patent
Evans et al.

(10) Patent No.: US 9,994,180 B2
(45) Date of Patent: Jun. 12, 2018

(54) RESTRAINT SYSTEM, OPTIONALLY HANDS FREE

(71) Applicant: Pratt & Miller Engineering and Fabrication, Inc., New Hudson, MI (US)

(72) Inventors: Celyn M. Evans, Milford, MI (US); Steven Reini, Waterford, MI (US); Erik Hardy, Highland, MI (US); Benjamin K. Bosworth, Fenton, MI (US); Benjamin L. Brooke, Walled Lake, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 41 days.

(21) Appl. No.: 15/267,709

(22) Filed: Sep. 16, 2016

(65) Prior Publication Data

US 2017/0080887 A1 Mar. 23, 2017

Related U.S. Application Data

(60) Provisional application No. 62/219,975, filed on Sep. 17, 2015.

(51) Int. Cl.
| | |
|---|---|
| *B60R 21/02* | (2006.01) |
| *B60R 21/18* | (2006.01) |
| *B60N 2/42* | (2006.01) |
| *B60R 21/00* | (2006.01) |

(52) U.S. Cl.
CPC ............ *B60R 21/18* (2013.01); *B60N 2/4242* (2013.01); *B60R 21/02* (2013.01); *B60R 2021/0097* (2013.01); *B60R 2021/022* (2013.01)

(58) Field of Classification Search
CPC . B60R 21/18; B60R 21/02; B60R 2021/0097; B60R 2021/022; B60R 22/00; B60R 21/026; B60N 2/4242; B60N 2/2839; B60N 2/24; A47C 1/00; A63G 9/00; A63G 7/00; A63G 3/02; A63G 1/00
USPC .......................................................... 701/45
See application file for complete search history.

(56) References Cited

U.S. PATENT DOCUMENTS

| | | | |
|---|---|---|---|
| 3,720,445 A | 3/1973 | Bennett | |
| 3,802,737 A | 4/1974 | Mertens | |
| 3,934,898 A | 1/1976 | Long | |
| 4,005,877 A * | 2/1977 | Humphries | ............ B60R 21/02 280/748 |
| 4,413,838 A | 11/1983 | Varterasian et al. | |
| 5,272,984 A | 12/1993 | Bolliger et al. | |

(Continued)

FOREIGN PATENT DOCUMENTS

EP 1905658 A1 4/2008

*Primary Examiner* — McDieunel Marc
(74) *Attorney, Agent, or Firm* — Brinks Gilson & Lione (57) ABSTRACT

A restraint system is provided for a manned vehicle. The restraint system may optionally be automatically actuated; that is, hands-free to the seat occupant or occupants where the restraint system is vehicle-wide. The restraint system may comprise a first component including an upper restraint and at least one secondary restraint apparatus such as an airbag or a belt system. The restraint system may have a manual override so an occupant can exit when circumstances require, even if the automated parameters would otherwise keep the restraints locked.

20 Claims, 5 Drawing Sheets

(56) References Cited

U.S. PATENT DOCUMENTS

| | | | |
|---|---|---|---|
| 5,499,844 A * | 3/1996 | Dirck | B60R 21/02 |
| | | | 280/748 |
| 5,527,223 A * | 6/1996 | Kitchen | A63G 9/00 |
| | | | 472/118 |
| 5,529,382 A | 6/1996 | Burkat | |
| 5,758,582 A * | 6/1998 | Gnezdilov | B60N 2/24 |
| | | | 104/241 |
| 5,769,498 A | 6/1998 | Smith et al. | |
| 5,857,751 A * | 1/1999 | Koledin | B60N 2/2839 |
| | | | 297/216.1 |
| 5,884,563 A * | 3/1999 | Sheldon | A61G 3/02 |
| | | | 104/53 |
| 5,894,905 A | 4/1999 | Abels et al. | |
| 6,053,580 A | 4/2000 | White, Sr. | |
| 6,098,549 A * | 8/2000 | Mares | A63G 1/00 |
| | | | 104/53 |
| 6,227,121 B1 * | 5/2001 | Mares | A63G 1/00 |
| | | | 104/53 |
| 6,637,341 B2 | 10/2003 | Kroon et al. | |
| 7,513,575 B1 | 4/2009 | Go | |
| 7,641,233 B2 | 1/2010 | Korechika | |
| 8,297,698 B2 | 10/2012 | Swierczewski | |
| 8,308,245 B2 * | 11/2012 | Roodenburg | B60R 21/026 |
| | | | 297/487 |
| 8,485,471 B2 | 7/2013 | Patterson et al. | |
| 9,340,180 B2 * | 5/2016 | Planer | B60R 22/00 |
| 9,603,450 B2 * | 3/2017 | Planer | A47C 1/00 |
| 2004/0032157 A1 * | 2/2004 | Trimborn | A63G 7/00 |
| | | | 297/484 |
| 2011/0210598 A1 | 9/2011 | Kovac | |
| 2014/0077538 A1 * | 3/2014 | Hiemenz | B60N 2/4242 |
| | | | 297/217.2 |

\* cited by examiner

RESTRAINT SYSTEM, OPTIONALLY HANDS FREE

CROSS-REFERENCE TO RELATED APPLICATION

This application claims priority to U.S. Provisional Patent Application 62/219,975 filed Sep. 17, 2016, which is hereby incorporated by reference in its entirety.

TECHNICAL FIELD

This disclosure relates to restraint systems for retaining an occupant in a vehicle. The vehicle can be any of a number of vehicle types, including manned military vehicles and civilian vehicles.

BACKGROUND

Certain known restraint systems present challenges regarding the ease and speed of ingress and egress of occupants, including occupants who are soldiers of various sizes carrying certain gear on and in military garments. Certain known restraint systems may be difficult to update when a portion of the system becomes worn or broken. Thus, modularity and/or independent operation of components in restraint systems may be desired. Modular architecture for such systems may provide for improved efficiency in repair and/or replace activities.

It is also desired for restraint systems to provide excellent containment and protection during "events." In military applications, such events may include underbody blasts, frontal, side and rear crashes, rollovers, and severe driving conditions such as wildly uneven terrain. Combinations of independent restraint systems may work synergistically for containment. Methods for making and using restraint systems providing one or more of these advantages are also desired. Uneven loading of occupant gear (outwear, equipment, etc.) may also create a need for independent restraints. For example, certain solder load outs are physically asymmetrical, making conventional symmetrical belts and restraint systems cumbersome, and in some instances, potentially less effective.

DETAILED DESCRIPTION

All figures and examples herein are intended to be non-limiting; they are mere exemplary iterations and/or embodiments of the claims appended to the end of this description. Modifications to structure, materials, the order of steps in procedures, temperature ranges, are contemplated.

Figure 1:
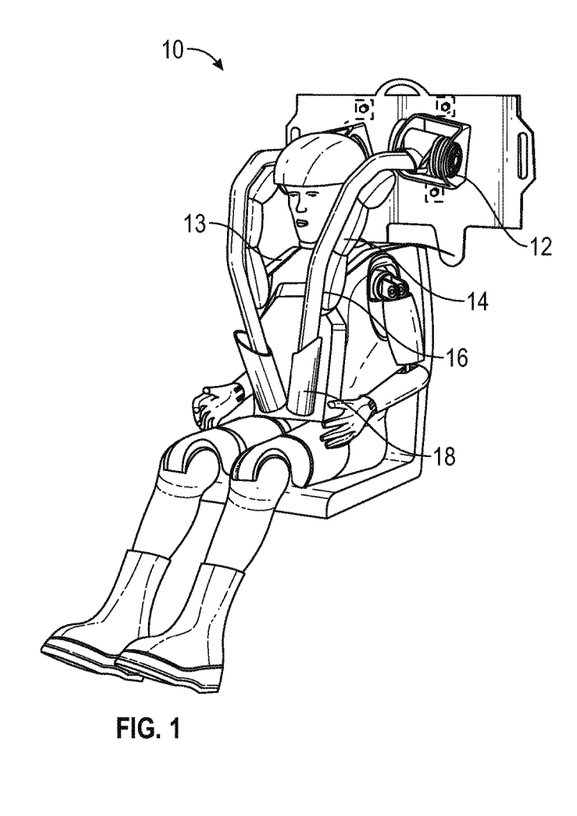
FIG. 1 is a perspective view of an exemplary restraint system.

Referring to FIG. 1, an exemplary restraint system 10 is illustrated. In FIG. 1, the restraint system 10 includes a pair of independently operable restraint bars 16 pivotally connected with a locking pivotal connection device 12 to a rigid surface. These restraint bars are components in an "upper restraint apparatus." Each restraint bar 16 optionally includes padded members 18 for comfort and/or added protection. The restraint bars 16 of the upper restraint apparatus may be padded in and/or near the region where such restraint bars could contact the shoulders and neck of the occupant. Each of the restraint bars 16 may be configured to be readily adjustable to a wide variety of occupant shapes and sizes, with and without additional gear or equipment on such occupants.

It is contemplated that, although the restraint bars 16 are capable of operating independently, they may optionally be in electrical and/or mechanical communication to work together when the environmental conditions call for such action. That is, for example, when certain NVH (noise, vibration, and harshness) action, acceleration, GPS and/or other criteria caused by an event are sensed, and a processor determines that the sensed data satisfies predetermined criteria are satisfied, both arms should rise or lock down independently or together without manual adjustment by the occupant. Independent restraint bars 16 and/or other restraints may be controlled remotely by, in the example of a military configuration, a vehicle operator, commander, or team leader. Additionally, occupants can engage independent restraint bars 16 and/or other restraints by hand or by any number of hands-free options: foot, head, arm, leg, audio and/or visual input, etc.).

The upper restraint apparatus may include a two-bar configuration that is substantially open in a middle region. In the illustrated embodiment, each of the two bars operates independently of the other. This configuration increases head clearance during engaging and disengaging actions. As such, the restraint system is better able to accommodate helmets, hats and goggles and other large and/or awkwardly shaped equipment. Furthermore, this two-bar configuration clears an area around an occupant's chest for gear or equipment such as radios, grenades, or magazine pouches. The restraint bars 16 can also be donned asymmetrically by occupants to better accommodate objects such as, for example, oxygen tanks for first responders. The two-bar configuration may also allow easier emergency exit for at least the reason that only one bar of the upper restraint apparatus must be moved or removed for ingress and egress, though there are embodiments contemplated where both can be moved together.

The upper restraint apparatus can either be manually donned/doffed, or a layer of automation features may be optionally included that don/doff the upper restraint apparatus and/or a belt system with no manual input. This automation may involve a full hands-free or partial hands-free engagement (for example, a restraint bar use may be hands free while a belt system is not) of the restraint system about the occupant. In one illustrative example, hands-free to the occupant may involve a driver engaging the restraint system. It may involve a switch being operable an occupants head, foot or other. Automated functionality may be achieved in any number of ways. One method is to use an internal electric motor to control rotational position of the restraint bars, either independently or together as a unit, or across a number of seats in a common vehicle. In one embodiment, a linear actuator may operate a hydraulic master cylinder by, for example, a pull cable. An actuator may be located locally or remotely, and may be in electrical and/or mechanical communication with a plurality of seats and restraint bars on seats. This may, for example, permit release of all restraint bars on all seats simultaneously if an event should so require.

In another illustrative example, in addition to the ways of engaging restraint systems described above, at least some automated features may be controlled via detection with one or more sensors and locally or remotely controlled using one or more controllers having a processor. The controller may optionally include computer readable storage media for storing data representing instructions executable by a computer or microprocessor. Computer readable storage media may include one or more of random access memory as well as various non-volatile memory such as read-only memory or keep-alive memory. Computer readable storage media may communicate with a microprocessor and input/output circuitry via a standard control/address bus. As would be appreciated by one of ordinary skill in the art, computer readable storage media may include various types of physical devices for temporary and/or persistent storage of data. Exemplary physical devices include but are not limited to DRAM, PROMS, EPROMS, EEPROMS, and flash memory.

In the illustrated restraint system 10, a combination of secondary restraint apparatuses may provide synergistic containment benefit to the upper restraint apparatus. The illustrated secondary restraint apparatus of restraint system 10 comprise non-rigid members 13 and 14. In non-limiting FIG. 1, non-rigid member is a belt system 13 connected to one end to a restraint bar 16 and at another end to one of any of a number of retractors and/or retraction systems that are in or on a rigid member. Belt system 13 may accommodate the size, shape, and equipment sets of a wide range of occupants. The belt system 13 complements the restraint bars 16 of the upper restraint apparatus to increase the range of size and shapes that can be contained without a complicated multi-linked arm strategy. The belt system 13 also gives additional mobility and comfort to occupants as they may be configured to lock only in instances of events. The belt system 13 may also reduce movement in an event by slowing down the occupant before he or she pushes against one or more restraint bars 16 of the upper restraint apparatus. This permits custom, multi-stage tuning, which may in turn reduce injuries resulting from an event. The belt system 13 may attach to a vehicle in any number of ways. As illustrated in the non-limiting example, the belt system 13 attaches to the pair of pull-down restraint bars 16 at or near a base of the restraint bars 16 and to mounting componentry affiliated with the seat. The belts affiliated with the belt system 14 can be stored on a spool system which may include an inertia-based locking mechanism.

In the non-limiting FIG. 1, a secondary restraint apparatus of a non-rigid member is an air bag system 14 connected to a restraint bar 16. Air bag system 14 may improve containment of a head or neck in both side and frontal impacts. Air bag system 14 may be mounted directly to the restraint bars 16, which may improve system performance and retain independence from other vehicle components. Air bag system 14 may work as other conventional airbags, and be remotely deployable depending upon sensed data (for example, from one or more accelerometers) and how the data compares to predetermined thresholds. Other non-rigid members may be included as secondary restraint apparatuses in the restraint system 10.

Figure 2:
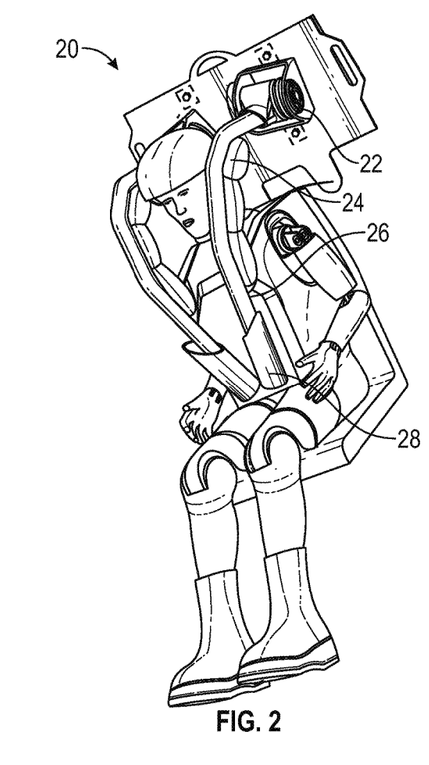
FIG. 2 is a perspective view of an exemplary restraint system.

Referring to FIG. 2, an exemplary restraint system 20 is illustrated. Restraint system 20 includes locking pivotal connection device 22, an upper restraint apparatus including restraint bars 26 with padded members 28 in combination with a secondary restraint apparatus of a non-rigid member shown as air bag system 24. In the example of exemplary restraint system 20, belts systems are not used.

Figure 3:
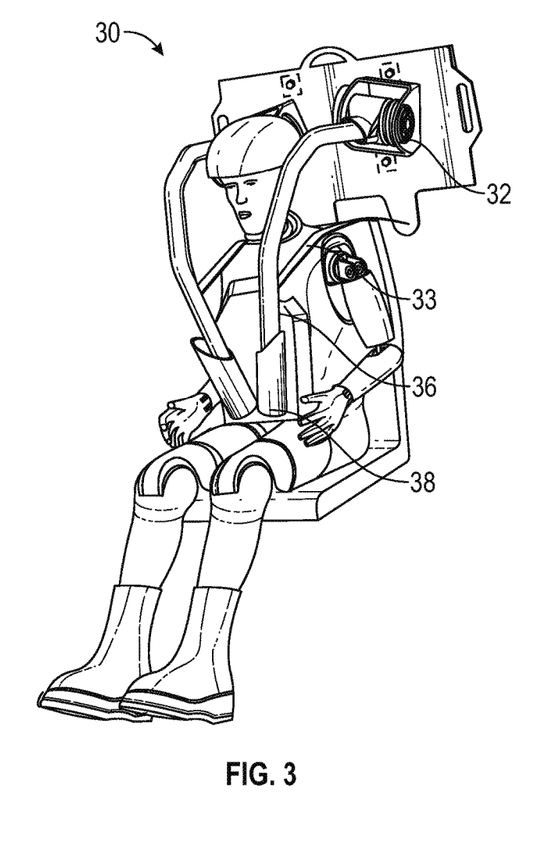
FIG. 3 is a perspective view of an exemplary restraint system.

Referring to FIG. 3, an exemplary restraint system 30 is illustrated. Restraint system 30 includes locking pivotal connection device 32, an upper restraint apparatus including restraint bars 36 with padded members 38 in combination with a secondary restraint apparatus of a non-rigid member shown as belt system 33. In the example of exemplary restraint system 30, air bag systems are not used.

Figure 4:
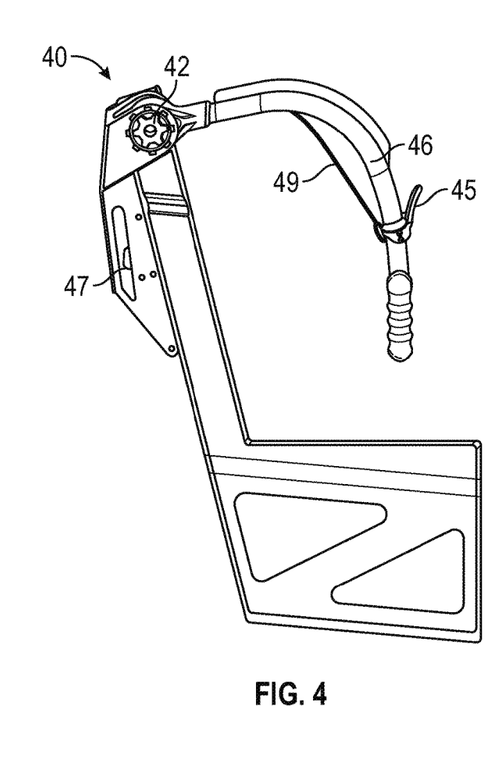
FIG. 4 is a side view of an exemplary restraint system.

Referring to FIG. 4, a portion of an exemplary restraint system 40 is illustrated. Restraint system 40 includes a combination of an upper restraint apparatus including rigid restraint bars 46. The seat includes retractors 47 mounted to rigid structure, but the associated belt is not illustrated so an emergency manual release system can be more readily seen. The manual release system includes release handle 45 that is in mechanical and/or electrical communication with structure in the locking pivotal connection device 42. In this particular instance, it s a cable-drive release system with cable 49.

Figure 5:
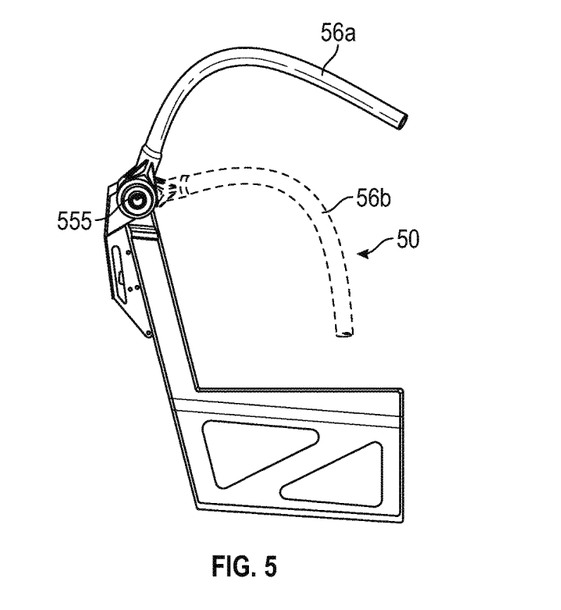
FIG. 5 is a side view showing exemplary independent restraint bars.

Referring to FIG. 5, an exemplary restraint system 50 is illustrated. In this view of restraint system 50, restraint bar 56a is lifted, while ghosted image 56b shows the restraint bar in the locked down position. This Figure also permits visualization of a one bar up and one bar down position. A side view is shown of the locking pivotal connection device 555. This embodiment is shown with an optional add-on of a lap belt.

Figure 6:
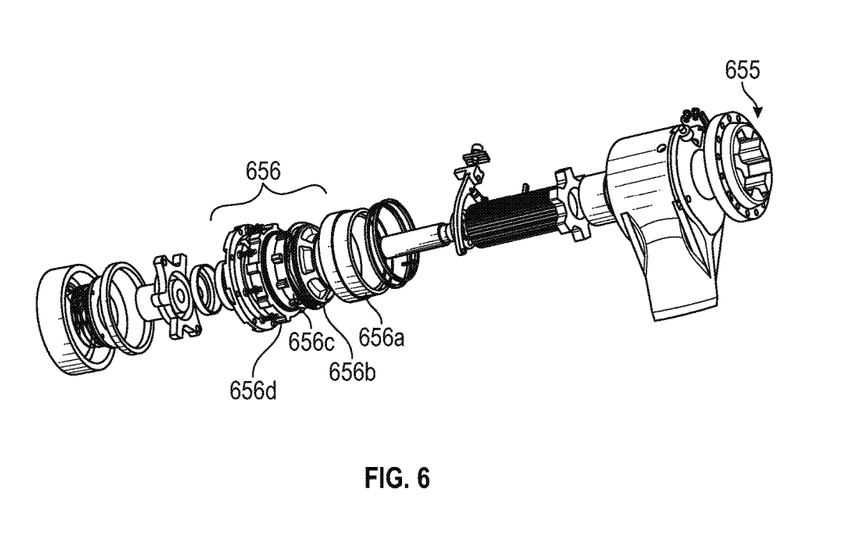
FIG. 6 is an exemplary ratchet mechanism with a locking pivot and a release system.

Referring to FIG. 6, an exemplary ratchet mechanism 655 includes locking pivotal structure for restraint bars and communicates with the manual release system. In this non-limiting example, gear system 656 includes a throw out bearing 656a three gears of different sizes and configuration (656b, 656c, 656d) to provide additional incremental adjustment for a refined, precise fit for occupants of various sizes and shapes, including asymmetrical shapes. Ratcheting face gears may be configured to lock the system throughout the permissible range of motion of a restraint arm, and release by a hydraulic throw out bearing separating the contact faces of the gears in the ratcheting gear system.

Figure 7:
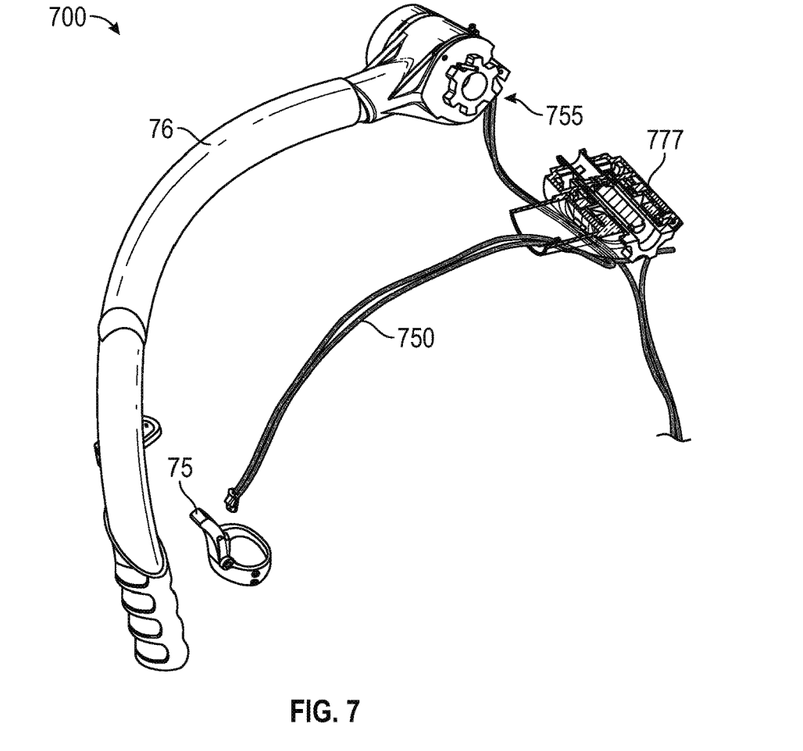
FIG. 7 is a portion of an exemplary manual release system.
Figure 8:
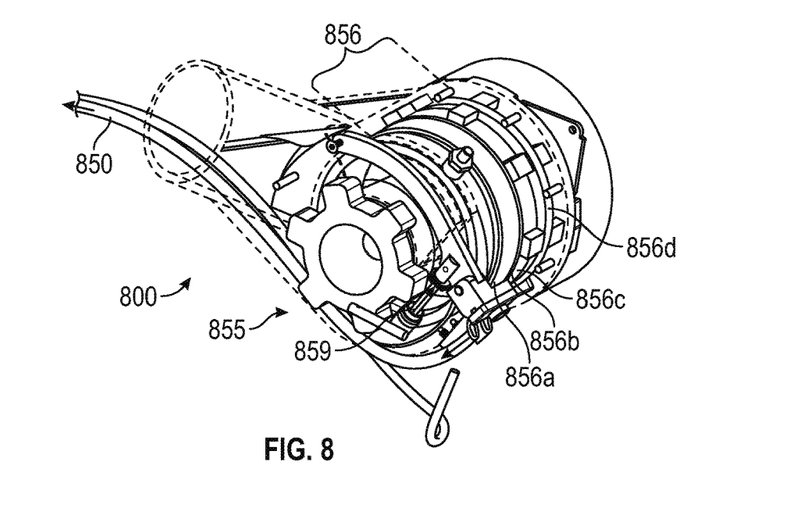
FIG. 8 is a detailed view of a portion of an exemplary manual release system.

Referring to FIGS. 4, 7 and 8, portions of exemplary manual release systems 700 and 800 are shown. The illustrated manual release systems may override some or all of the automated features of the restraint system to allow the occupant the flexibility to disengage the system while in the seated position. This method of disengagement may be useful in non-emergency events such as vehicle power loss or system failure. To minimize or prevent the scenario of an occupant being "trapped" by the restraint system, an emergency release may be incorporated into the architecture. The manual release system may be cable-driven, hydraulic, pneumatic, electronic, electromagnetic, or other or combination of one or more.

The non-limiting manual release systems 700 and 800 illustrate a cable-driven system. In FIG. 7, an occupant pulls the release handle 75 and cable 750 communicates with the structure in the ratchet of the locking pivotal connection device 755 so that restraint bar 76 may be lifted even though sensed data and processor output would otherwise cause the restraint bar 76 to be immobile. The system 700 may optionally include a processor 777 with its structure that is in electrical communication with other processors, sensors, or other electrical systems useful to the restraint system as a whole or portions thereof.

FIG. 8 provides a more detailed view of an exemplary cable-driven manual release system 800. When cable 850 is pulled, this drives plunger 859 which is in mechanical communication with the ratchet of the locking pivotal connection device 855. As illustrated, gear system 856 includes throw-out bearing 856a, and ratchet gears 856b (not shown in FIGS. 8), 856c and 856d. When pulled, plunger 859 moves a throw-out bearing 856a which in turn moves a larger ratchet gear 856d and then a smaller ratchet gear 856c and a smaller gear 856b (not shown in FIG. 8) to disengage the restraint bar affiliated with the manual release system 800.

Figure 9:
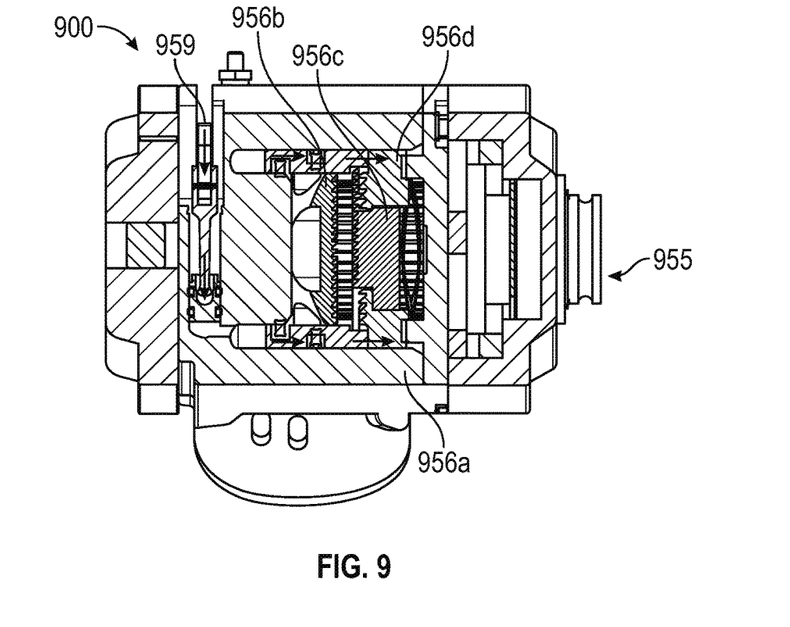
FIG. 9 is a detailed view of a portion of an exemplary manual release system in a decoupled position.

FIG. 9 provides a detailed cut-away side view of a locking pivotal connection device 955 as a portion of an exemplary manual release system 900 in a decoupled or unlocked position. Plunger 959 is down, causing movement of the throw out bearing 956a and gears 956b, 956c, and 956d to unlock at least the upper restraint system.

Figure 10:
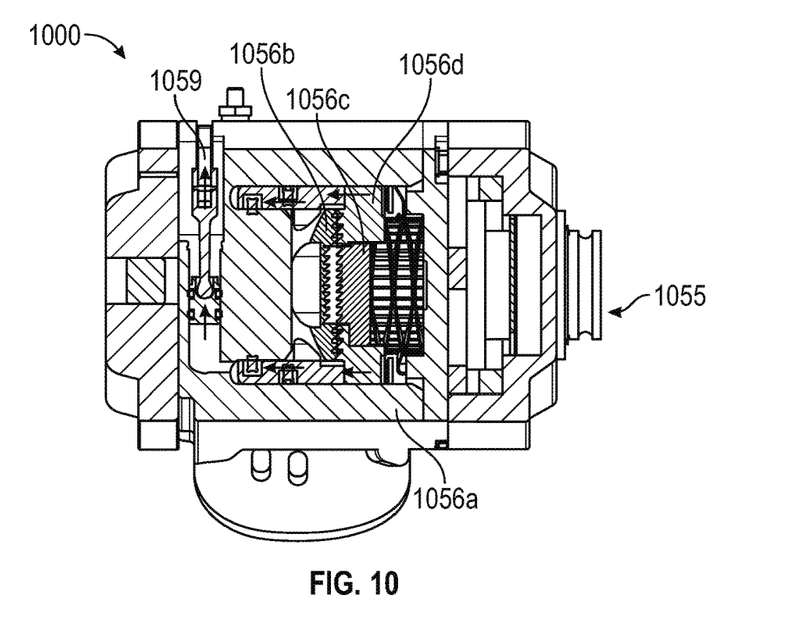
FIG. 10 is a detailed view of a portion of an exemplary manual release system in a coupled position.

FIG. 10 provides a detailed cut-away side view of a locking pivotal connection device 1055 as a portion of an exemplary manual release system 1000 in a coupled or locked position. Before an occupant overrides the lock (whether set automatically or manually), plunger 1059 is up, and gears 1056b, 1056c, and 1056d are disclosed as illustrated. Other configurations, for example with more or fewer gears, are contemplated, as other entirely different manual override systems. The disclosed restraint systems herein are not limited to cable-driven manual release systems.

The disclosed restraint systems may be complemented with any of a number of features, add-ons and alternative configurations. For example, the independently movable restraint bars may lock together once donned. The restraint bars may be configured to move in unison unless released to act independently. The automatic features, in addition to electronic controls, may incorporate hydraulics in the moving parts. Materials may vary so long as safety specifications are met or exceeded. Such materials may provide for flexibility in the restraint bars. Add-ons may include, for example, supplemental non-rigid members in a vehicle designed for increased containment. A webbing stowage device is contemplated that may have a locking mechanism. The webbing stowage device may be fixed to an end of a restraint bar with the free end of the webbing fixed to a vehicle seat, or the webbing stowage device may be fixed to the seat with the free end of the webbing fixed to a restraint bar. The webbing stowage device may either lock by bulk motion, manually, or remotely.

The components of the disclosed restraint systems may have modular architecture. An additional head restraint may be combined with the restraint system. Upper and/or lower side bolsters may be combined with the disclosed restraint systems individually or in combination. Both symmetric or asymmetric configurations are contemplated. Anti-submarining features may be combined with the disclosed restraint systems, whether automatic or manual. An anti-submarining feature that comprises a section of flexible webbing that is manually coupled to one or more of the rigid restraint bars may be included. A center bolster may be combined with the restraint system. A leg bolster and/or a side bolster may also be combined with the restraint system. The restraint system, through its modular architecture, may be assembled and serviced without tools or with minimal tools.

With regard to the processes described herein, it should be understood that, although the steps of such processes, have been described as occurring in a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A restraint system, comprising:
   an upper restraint apparatus including two independently movable restraint bars; and
   each of the independently movable restraint bars being pivotally attached to rigid structure, the independently movable restraint bars being lockable manually or automatically.

2. The restraint system of claim 1 further including a secondary restraint apparatus comprising a non-rigid member connected to at least one restraint bar.

3. The restraint system of claim 2 wherein the non-rigid member is one or more of:
   a belt system mechanically connected to one restraint bar and operably connected to a retractor; and
   an airbag.

4. The restraint system of claim 2 wherein restraint system comprises both a belt system and an airbag.

5. The restraint system of claim 2 wherein the upper restraint apparatus is operable hands-free and includes an emergency release mechanism.

6. The restraint system of claim 1 wherein the upper restraint apparatus system is lockable with a hands-free mechanism.

7. The restraint system of claim 6 wherein the hands-free mechanism locks upon at least one of mechanical and electrical input from at least one of a switch positioned to be triggerable by a vehicle driver, a commander, a team leader, an occupant head, an occupant arm, an occupant foot, an occupant leg, or one or more accelerometers.

8. A seat with a restraint system, the seat comprising:
   an upper restraint apparatus including two independently movable restraint bars;
   a secondary restraint apparatus attached to at least one of the movable restraint bars, the secondary restraint system being in one or more of electrical or mechanical communication with the upper restraint system; and a processor in electrical communication with at least one of the upper restraint apparatus and the secondary restraint apparatus, the processor further being in electrical communication with at least one sensor capable of detecting acceleration, such that when acceleration data exceeds a predetermined threshold, the processor causes one or more of the upper restraint apparatus and the secondary restraint apparatus to automatically lock in position.

9. The seat of claim 8 wherein the secondary restraint apparatus includes a non-rigid member.

10. The seat of claim 8 wherein the non-rigid member includes an airbag.

11. The seat of claim 8 wherein the non-rigid member includes a belt system.

12. The seat of claim 8 wherein the secondary restraint apparatus includes a plurality of non-rigid members, including at least one belt system and at least one airbag.

13. The seat of claim 8 wherein the at least one sensor comprises a plurality of accelerometers.

14. The seat of claim 8 further comprising a manual override release mechanism for at least one restraint bar.

15. The seat of claim 8 further comprising a manual override release mechanism causing a secondary restraint apparatus to disengage from a lock position.

16. A military seat with a restraint system, the military seat comprising:
   an upper restraint apparatus including two independently movable restraint bars lockable in symmetrical and asymmetrical positions;
   a secondary restraint apparatus attached to at least one of the movable restraint bars, the secondary restraint system being in one or more of electrical or mechanical communication with the upper restraint system;
   hands-free mechanism for locking the upper restraint apparatus; and
   a manual override release system to unlock the upper restraint apparatus.

17. The military seat of claim 16 wherein the secondary restraint apparatus includes a non-rigid member.

18. The military seat of claim 17 wherein the non-rigid member includes one or more of an airbag and a belt.

19. A vehicle comprising a plurality of military seats of claim 16 in electrical or mechanical communication with one another.

20. The military seat of claim 16 wherein the secondary restraint apparatus includes a plurality of non-rigid members.

\* \* \* \* \*

UNITED STATES PATENT AND TRADEMARK OFFICE
CERTIFICATE OF CORRECTION

PATENT NO. : 9,994,180 B2
APPLICATION NO. : 15/267709
DATED : June 12, 2018
INVENTOR(S) : Celyn M. Evans et al.

It is certified that error appears in the above-identified patent and that said Letters Patent is hereby corrected as shown below:

In the Specification

Column 1, Line 9, Please insert the following paragraph after "CROSS-REFERENCE TO RELATED APPLICATION":
--STATEMENT OF GOVERNMENT INTEREST
This invention was made with Government support under W56HZV-15-C-0046 awarded by the United States Government- Army Contracting Command Warren, MI. The Government has certain rights in the invention--.

Signed and Sealed this
Fourteenth Day of July, 2020

Andrei Iancu
*Director of the United States Patent and Trademark Office*